(12) United States Patent
Perentes et al.

(10) Patent No.: US 10,633,173 B2
(45) Date of Patent: Apr. 28, 2020

(54) PACK FOR EXTRACTING A COFFEE BEVERAGE

(71) Applicant: NESTEC S.A., Vevey (CH)

(72) Inventors: Alexandre Perentes, Lausanne (CH);
Youcef Ait Bouziad, Echandens (CH);
Damien Neurohr, Sion (CH)

(73) Assignee: Societe des Produits Nestle S.A., Vevey (CH)

( * ) Notice: Subject to any disclaimer, the term of this patent is extended or adjusted under 35 U.S.C. 154(b) by 455 days.

(21) Appl. No.: 15/503,782

(22) PCT Filed: Jul. 23, 2015

(86) PCT No.: PCT/EP2015/066850
§ 371 (c)(1),
(2) Date: Feb. 14, 2017

(87) PCT Pub. No.: WO2016/023730
PCT Pub. Date: Feb. 18, 2016

(65) Prior Publication Data
US 2017/0275086 A1 Sep. 28, 2017

(30) Foreign Application Priority Data

Aug. 14, 2014 (EP) .................................. 14180919

(51) Int. Cl.
*A47J 31/40* (2006.01)
*A47J 31/44* (2006.01)
(Continued)

(52) U.S. Cl.
CPC ........ *B65D 85/8043* (2013.01); *A47J 31/407* (2013.01); *A47J 31/4492* (2013.01);
(Continued)

(58) Field of Classification Search
CPC ...... A47J 31/407; A47J 31/4492; A47J 31/44; A47J 31/42; A47J 31/22; A47J 31/36;
(Continued)

(56) References Cited

U.S. PATENT DOCUMENTS

| 2012/0210879 A1* | 8/2012 | Mariller | B65D 85/8043 99/295 |
| 2013/0011521 A1* | 1/2013 | Weijers | A47J 31/36 426/87 |

(Continued)

FOREIGN PATENT DOCUMENTS

| CN | 1345199 A | 4/2002 |
| CN | 101263064 A | 9/2008 |

(Continued)

*Primary Examiner* — Tu B Hoang
*Assistant Examiner* — Tiffany T Tran
(74) *Attorney, Agent, or Firm* — K&L Gates LLP

(57) ABSTRACT

Fitment assembly (10) for a container comprising in its inside volume a coffee ingredient, the fitment assembly (10) comprising: an inlet chamber (120) to accommodate an inflow of fluid for flowing through the coffee ingredient to extract a coffee beverage; a tertiary active chamber (231) on one of the sides of the fitment assembly (10) to where extracted coffee fluid together with the coffee ingredient particles is conveyed and a tertiary passive chamber (232) on the reverse side of the fitment assembly (10) to where the extracted coffee fluid after having been filtered is conveyed; a primary filter element (11) filtering the extracted coffee fluid coming from the tertiary active chamber (231) and flowing into the tertiary passive chamber (232) in such a way that only the fluid can go through and into the tertiary passive chamber (232) while the particles of coffee ingredient are retained in the tertiary active chamber (231); and an outlet duct (12) arranged in such a way that the extracted coffee beverage from the tertiary passive chamber (232)
(Continued)

enters the outlet duct (12) and flows by gravity towards the exterior of the fitment assembly (10).

11 Claims, 7 Drawing Sheets

(51) Int. Cl.
  *B65D 65/40* (2006.01)
  *B65D 75/20* (2006.01)
  *B65D 75/30* (2006.01)
  *B65D 75/58* (2006.01)
  *B65D 85/804* (2006.01)

(52) U.S. Cl.
  CPC ............ *B65D 65/40* (2013.01); *B65D 75/20* (2013.01); *B65D 75/30* (2013.01); *B65D 75/5883* (2013.01)

(58) Field of Classification Search
  CPC ...... A47J 31/40; A47J 43/046; A47J 31/4485; A47J 31/446; A47J 31/3633; A47J 31/3638; A47J 31/401; A47J 31/41; B65D 65/40; B65D 75/20; B65D 75/30; B65D 75/5883; B65D 85/8043; B65D 2081/007; B65D 2085/8043; B65D 2085/8044; B65D 2085/8045; B65D 2085/8046
  USPC .... 99/295, 283, 279, 275; 426/77, 112, 115, 426/394, 433
  See application file for complete search history.

(56) References Cited

U.S. PATENT DOCUMENTS

2013/0062366 A1* 3/2013 Tansey .................... A47J 31/44
                                                              222/102
2016/0311607 A1* 10/2016 Malcolm ............ B65D 75/5883

FOREIGN PATENT DOCUMENTS

| CN | 102574637 A | 12/2014 | |
|---|---|---|---|
| WO | 9905044 | 2/1999 | |
| WO | WO-2006123131 A1 * | 11/2006 | ......... B65D 75/5866 |
| WO | 2011024103 | 3/2011 | |
| WO | 2011054402 | 5/2011 | |
| WO | 2016016072 A1 | 2/2016 | |
| WO | 2016016074 A1 | 2/2016 | |
| WO | 2016020197 A1 | 2/2016 | |

* cited by examiner

PACK FOR EXTRACTING A COFFEE BEVERAGE

CROSS REFERENCE TO RELATED APPLICATIONS

The present application is a National Stage of International Application No. PCT/EP2015/066850, filed on Jul. 23, 2015, which claims priority to European Patent Application No. 14180919.4, filed Aug. 14, 2014, the entire contents of which are being incorporated herein by reference.

FIELD OF THE INVENTION

The present invention relates to a pack for extracting a coffee beverage; in particular it refers to a disposable pack for preparing a coffee beverage, by means of a fitment assembly comprised in the disposable pack. The invention also refers to a machine for extracting a coffee beverage from such a disposable pack.

BACKGROUND OF THE INVENTION

Devices for preparing a coffee beverage are known devices in the state of the art. Typically, these devices extract coffee by the use of a particular machine where hot water passes through a filter which contains unpressed ground coffee, the infused hot water being then deposited by gravity into a carafe below, where the coffee beverage is retained. Typically, these machines comprise a water tank and a pump which sends the heated water into a container where a paper filter containing coffee is arranged. The hot water submerges the coffee and, after passing through the filter, falls by gravity into an appropriate carafe below suited for maintaining the beverage hot for a long time since it is heated by a specific electrical warming plate. However, these devices have to be cleaned after each use, are not made disposable and the paper filter needs to be replaced every time a new coffee beverage is prepared. Furthermore, the process requires long time and the beverage preparation is not optimized, varying from one extraction to another.

Other known manual devices or methods for preparing coffee beverages typically need a paper filter containing coffee, through which hot water flows in order to obtain the targeted beverage. In one way or another, when the user makes the process manually, plenty of operations need to be performed from the user's side for the preparation and for the cleaning afterwards, which renders the process very inconvenient, tiresome and time consuming.

Using capsules comprising coffee inside, through which water is injected to brew the beverage, also presents several disadvantages, such as for example, the cost of the capsules and the packaging space needed to arrange and keep these capsules.

Therefore, it would be desirable to provide a disposable flexible pack from which a coffee beverage can be extracted in a reduced time, where recipes and extraction parameters are automatically adapted such that the beverage preparation is optimized.

Moreover, the pack needs to be easy to use, clean and requiring the least of input operations from the side of the consumer.

The present invention comes to provide a solution to the above-described needs, as it will be further explained. The invention also aims at other objects and particularly at the solution of other problems as will appear in the rest of the present description.

SUMMARY OF THE INVENTION

According to a first aspect, the invention refers to a fitment assembly 10 for a container comprising in its inside volume a coffee ingredient, preferably coffee powder, more preferably roast and ground coffee powder. The fitment assembly 10 of the invention comprises: an inlet chamber 120 to accommodate an inflow of fluid for flowing through the coffee ingredient to extract a coffee beverage; a tertiary active chamber 231 on one of the sides of the fitment assembly 10 to where extracted coffee together with coffee ingredient particles is conveyed and a tertiary passive chamber 232 on the reverse side of the fitment assembly 10 to where the extracted coffee fluid after having been filtered is conveyed; a primary filter element 11 filtering the extracted coffee fluid coming from the tertiary active chamber 231 and flowing into the tertiary passive chamber 232 in such a way that only the fluid can go through and into the tertiary passive chamber 232 while the particles of coffee ingredient are retained in the tertiary active chamber 231; and an outlet duct 12 arranged in such a way that the coffee beverage from the tertiary passive chamber 232 enters the outlet duct 12 and flows by gravity towards the exterior of the fitment assembly 10.

The inlet chamber 120 of the fitment assembly 10 according to the invention is preferably reversibly configured. The fitment assembly 10 comprises a lid with a first section overlying one of the sides of the inlet chamber 120 and closing the tertiary active chamber 231, and a second section overlying the reverse side of the inlet chamber 120 and closing the tertiary passive chamber 232.

The fitment assembly 10 typically further comprises two symmetrically arranged inlet notches 110 allowing the fluid to flow out of the inner volume of the inlet chamber 120.

The fitment assembly 10 further comprises an upper filtering notch 18 arranged so as to allow the fluid to go through and into the inner volume of the tertiary active chamber 231.

Besides, according to the invention, the fitment assembly 10 further comprises a side frontal filtering notch 18' arranged so as to allow the fluid to be conveyed towards the entrance of the outlet duct 12.

The fitment assembly 10 is typically made of a rigid plastic material preferably made by injection moulding, the material being preferably selected from: polypropylene, polyethylene, polyethylene terephthalate and/or polylactic acid.

The outlet duct 12 of the fitment assembly 10 of the invention is closed by means of a plug 14, the plug 14 being attached to the fitment assembly 10 on another one of its sides. The outlet duct 12 further comprises a weakened area 16 near the plug 14 which allows the separation of the plug 14 from the outlet duct 12.

According to a second aspect, the invention refers to a pack 100 for extracting a coffee beverage, comprising a container 20 where a coffee ingredient is stored and a fitment assembly 10 as previously described.

Typically, the pack 100 of the invention presents an essentially plane shape being substantially flexible and configured as a pouch or sachet. The pack is oriented along a plane essentially vertically oriented during beverage production, such that the fitment assembly 10 is preferably arranged at the lower side of the pack during beverage production and dispensing.

The container 20 of the pack 100 of the invention is made of two flexible sheets bonded together at least on their lateral sides, the fitment assembly 10 being also bonded to one of the remaining open edges of the pack 100 in such a way that the flexible sheets also conform a piercable lid over the fitment assembly 10.

The two flexible sheets of the pack 100 of the invention are configured by one single flexible sheet folded in half into two parts joined at its free edges to define the inner volume of the container 20. These sheets are typically water impermeable and are bonded together by thermo sealing, being made of a material which is one or a combination of the following: plastic laminates, metallised foil or alufoil or fibre base material.

In the pack 100 of the invention, the two flexible sheets are bonded together in a specific area configuring a compartmental channel 250 inside the volume of the pack 100, such that the compartmental channel 250 is arranged in such a way that it defines inside the volume of the pack 100 a primary chamber 21, to where fluid is conveyed from the inlet chamber 120, and a secondary chamber 22 to where the fluid from the primary chamber 21 is conveyed in order to be flow through the coffee ingredient and extract the coffee beverage.

The pack 100 of the invention preferably further comprises a fluid distributor 24 arranged on one of the sides of the secondary chamber 22 designed in such a way that, the fluid leaving the primary chamber 21 enters the secondary chamber 22 through this fluid distributor 24 which homogeneously distributes the flow of fluid, typically hot water, into the secondary chamber 22 to flow through the coffee ingredient confined herein.

The fluid distributor 24 is preferably configured by bonding together at certain parts the sheets of flexible material making the container 20, these bonded parts configuring a plurality of distributor configuring elements 240 allowing a homogeneous distribution of the flow of fluid into the secondary chamber 22. The distribution and homogenisation characteristics of the fluid distributor 24 are a function of the size and number of the distributor configuring elements 240 and of the distance between these distributor configuring elements 240.

The pack 100 according to the invention further comprises identification means 30 comprising the information on the process parameters to produce the beverage, as a function of the type of coffee ingredient comprised in the pack, the process parameters being at least one or a combination of the following: temperature of the fluid accommodated into the inlet chamber 120, total volume of fluid and fluid flow accommodated inside the inlet chamber 120.

Typically, the pack 100 according to the present invention comprises two sets of symmetrically arranged identification means 30, so that the process parameters in the identification means 30 can be reversibly read.

The identification means 30 in the pack 100 comprise recognition means being at least one or a combination of the following ones: mechanical codes, optical codes, RFID tags, bar codes, magnetic codes, embossing codes or LED, the recognition means preferably comprising a plurality of punched holes arranged on the bonded lateral edges of the container 20.

Still according to a third aspect, the invention refers to a machine 200 for extracting a coffee beverage from a pack 100 as described previously. The machine 200 comprises receiving means 201 adapted to accommodate the pack 100 in an essentially vertical position during beverage production with the fitment assembly 10 being arranged at the bottom of the pack, the machine 200 further comprising injecting means 230 designed for accommodating fluid inside the volume of the inlet chamber 120.

Typically, the injecting means 230 comprise a fluid needle designed for accommodating fluid inside the volume of the inlet chamber 120 at a pressure below around 1 bar, preferably around 0.5 bar.

The machine 200 further comprises a data reader configured to read and retrieve the information of the process parameters from the identification means 30 in the pack 100, the data reader preferably comprising a light emitter device.

BRIEF DESCRIPTION OF THE DRAWINGS

Further features, advantages and objects of the present invention will become apparent for a skilled person when reading the following detailed description of non-limiting embodiments of the present invention, when taken in conjunction with the appended drawings, in which.

DETAILED DESCRIPTION OF EXEMPLARY EMBODIMENTS

Figure 1:
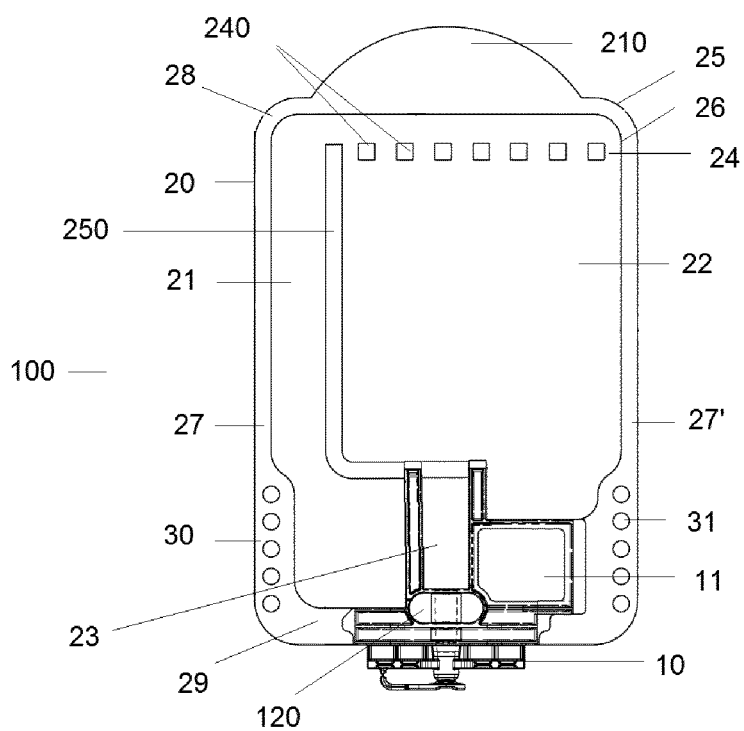
FIG. 1 shows a frontal schematic view of a pack for extracting a coffee beverage according to the present invention, comprising a fitment assembly and a container.

The present invention relates to a pack 100 for extracting coffee beverages. The pack 100 of the invention is preferably disposable and comprises a fitment assembly 10 and a container 20. The container 20 is preferably flexible and is typically made of two flexible sheets 25 and 26 bonded together, preferably by welding or by heat sealing (thermo sealing), on the lateral sides 27 and 27', on the upper side 28 and on the lower side 29. The fitment assembly 10 is preferably arranged at the lower side 29 of the container 20 such that the sheets cover at least partially the frontal and/or the rear side of the fitment assembly 10.

The fitment assembly 10 has three functions within the pack 100 according to the invention: it works as inlet for the fluid (typically hot water) coming into the pack 100 for flowing through a coffee ingredient, preferably coffee powder, more preferably roast and ground coffee powder, also comprised inside the volume of the pack 100; it works as a filtering element to filter the brewed coffee beverage before it is dispensed from the pack 100; and finally, the fitment assembly 10 also works as outlet for the coffee beverage brewed and prepared in the pack 100.

The fitment assembly 10 is preferably arranged in the lower side 29 of the pack 100, as schematically shown in FIG. 1. The fitment assembly 10 comprises an outlet duct 12, preferably arranged vertically and parallel to the lateral sides 27 and 27' of the pack 100 in order to allow the dispensing of the coffee beverage by free flow: during preparation and dispensing phases, the pack 100 is preferably arranged vertically, such that the fitment assembly 10 is arranged at the lower side 29 of the container 20, i.e., at the lower side 29 of the pack 100.

The container 20 is preferably flexible and is made of two flexible water impermeable sheets 25, 26 joined to one another to define an inner volume which is compartmented, as will be explained further in more detail. Typically, the container 20 presents an essentially plane shape being substantially flexible so that it looks like a pouch or sachet. By flexible, it is meant that the sheets 25, 26 can be bent easily. The resulting pack 100 can be bent also, as being soft and can be deformed contrary to rigid containers. The flexible sheet material for the sheets 25, 26 can be plastic laminates, metallised foil or alufoil or fibre base material. According to the invention, the container 20 can be formed of two separate flexible water impermeable sheets 25, 26 joined together or it can be formed of one single flexible water impermeable sheet folded in half into two parts or sheets 25, 26 and joined at its free edges to define the inner volume of the container 20.

According to a preferred embodiment, the container 20 is formed of one single flexible water impermeable sheet folded in half into two parts of flexible sheets which will be referred to as 25, 26, and joined at its free edges, such that the container 20 is configured as a plane pouch made of a flexible material sheet, said sheet being folded at the top of the container 20 (therefore, the upper side 28 will have no welding or heat sealing (thermo sealing) and will be made by the simple bending of the flexible sheet on top) and bonded on its edges (therefore, forming the lateral sides, 27 and 27') to define the inner volume, the bottom bonded edge (lower side 29) typically including the fitment assembly 10. This embodiment constitutes a particularly easy way to manufacture the pack 100 since it requires the cutting of only one piece of sheet—most preferably according to a rectangular shape—and its folding to create the inner volume of the container 20. Typically, also for manufacturing convenience, the fitment assembly 10 is introduced in the lower side 29 of the container 20 during the sealing of its edges, typically by welding or heat sealing.

As shown in FIG. 1, the sheets 25, 26 configuring the two sides of the container 20 are sealed together in a specific area in the inside of the container 20: the sheets 25 and 26 are preferably welded or heat sealed together, to form a compartmental channel 250 under a specific shape, as shown in FIG. 1, such that the internal different compartments are formed, as it will be further explained.

The compartmental channel 250 delimits together with one of the lateral sides 27, with the upper side 28 and with part of the lower side 29 of the container 20, together with the fitment assembly 10, an inner volume defining a primary chamber 21: in the primary chamber 21, the fluid injected through the fitment assembly 10, preferably hot water, is conveyed upwards. Also, the compartmental channel 250 together with the other lateral side 27', with the upper side 28 and with the fitment assembly 10 on the lower side of the container 29 delimits an inner volume defining a secondary chamber 22 where a beverage medium, typically coffee powder, preferably roast and ground coffee powder, is confined, with a small particle size preferably in the range from 0.2 mm to 0.8 mm, more preferably in the range from 0.3 mm to 0.4 mm, even more preferably of about 0.3 mm, such that the fluid coming from the primary chamber 21 is conveyed into this secondary chamber 22 to flow through the coffee powder and extract the coffee beverage.

Finally, a tertiary chamber 23 is also arranged in the container 20, comprising two chambers: a tertiary active chamber 231, delimited by one of the flexible sheets and by the primary filtering active side 111 of the primary filter element 11, and a tertiary passive chamber 232, delimited by the other flexible sheet, the primary filtering passive side 112, and an upper sealing wall 17. Therefore, the coffee beverage extracted in the secondary chamber 22 is first conveyed into the tertiary active chamber 231, from where it will pass through the primary filtering active side 111 into the tertiary passive chamber 232, thus being filtered, so that the final filtered coffee beverage will be conveyed to the outside of the pack 100 through the outlet duct 12.

The container 20 also comprises a fluid distributor 24 preferably configured by welding or heat sealing together in the upper part of the container 20 the sheets of material 25, 26 which make the flexible container 20, in certain and defined parts, configuring a plurality of distributor configuring elements 240. In FIG. 1 these sheets have been bonded together (typically welded or thermo sealed together) under square shapes, but it is clear that any other shape like circular, rectangular or any other would be possible and would therefore be comprised within the scope of the present invention. The fluid distributor 24 is aimed at homogeneously distribute the flow of fluid, typically hot water, into the secondary chamber 22 coming from the primary chamber 21. In this way, the flow of hot water will spread better over the complete mass of the coffee powder confined in the secondary chamber 22 so that an optimised coffee beverage is obtained. This configuration will also allow that the filtering of the extracted coffee beverage in the primary filter element 11 will be done also more effectively.

The size of the primary filter element 11 is preferably comprised in the range between 200 mm$^2$ and 3000 mm$^2$, more preferably in the range between 500 mm$^2$ and 1500 mm$^2$. It is to be noted that the components in FIG. 1 are not scaled and only intend to provide general schematic illustrations and positioning to explain the present invention.

The distribution and homogenisation characteristics of the fluid distributor 24 are a function of the size and number of the distributor configuring elements 240, and also of the distance between these distributor configuring elements 240.

Different sizes of the container 20 and therefore of the pack 100 could be used in the same machine adapted to store different quantities of ingredient and allowing different volumes of final coffee beverage obtained: typically, it is the configuration of the fitment assembly 10 as to external shape what determines the machine to use. Therefore, the size of the container 20, when extending vertically, does not determine or limit the machine. So, typically, the size of the container 20 will be adaptable and will be made so by modifying the height of said container 20.

The container 20 can also comprise an excrescence 210 enabling the handling of the pack 100 by the user or consumer, as schematically shown in FIG. 1 attached.

Preferably, according to the invention, the pack 100 presents a plane shape oriented along a plane essentially vertically oriented during beverage production in such a way that the water introduced in the fitment assembly 10 flows in an upward direction into the inner volume of the primary chamber 21.

Figure 2:
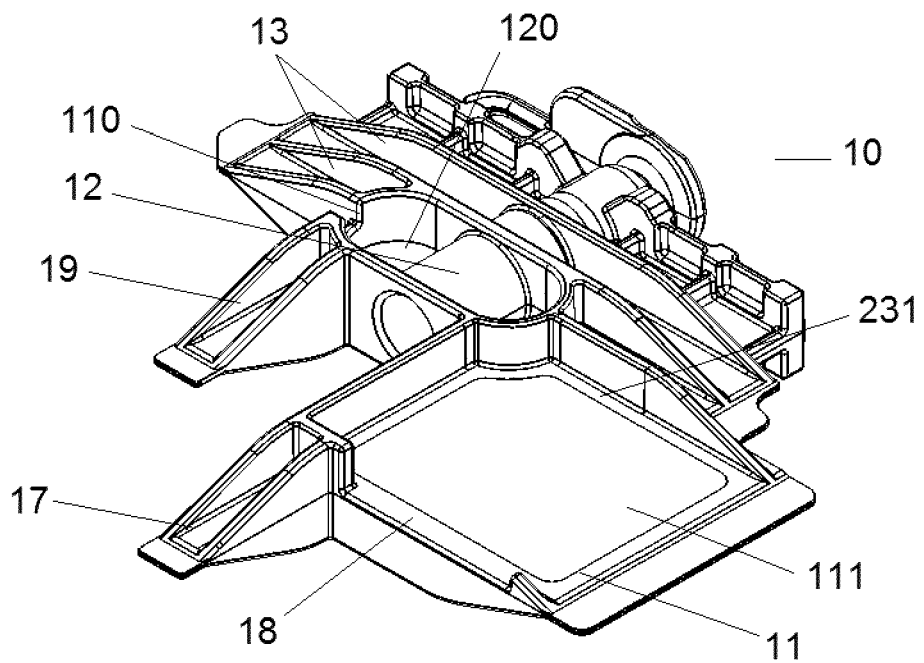
FIG. 2 shows an isometric detailed view of the fitment assembly of the disposable pack for extracting a coffee beverage shown in FIG. 1, according to the present invention.
Figure 3:
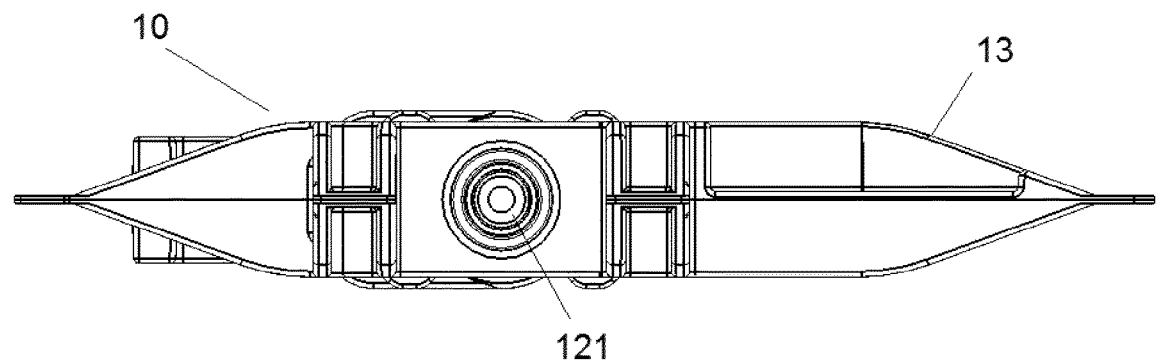
FIG. 3 shows a front detailed view of the fitment assembly of the disposable pack for extracting a coffee beverage shown in FIG. 1, according to the present invention.
Figure 4:
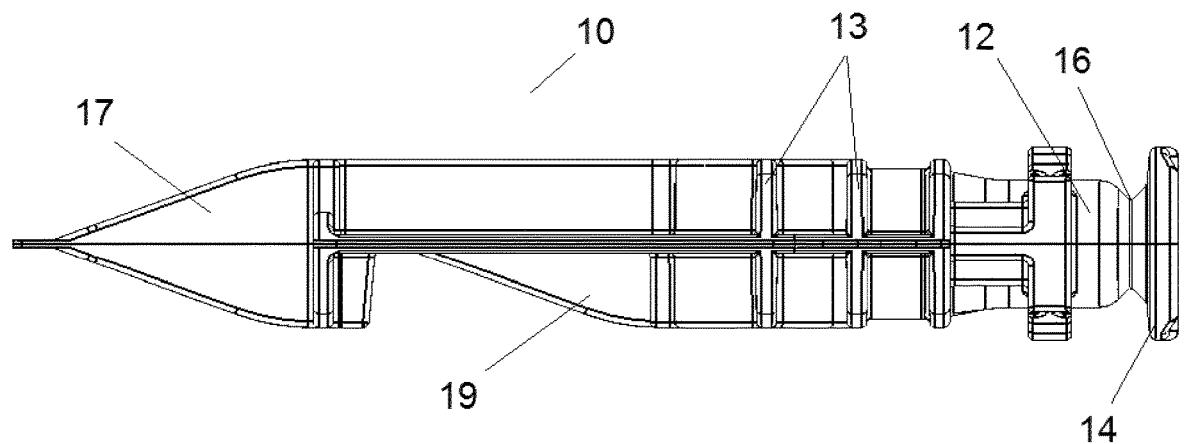
FIG. 4 shows a side detailed view from the right of the fitment assembly of the disposable pack for extracting a coffee beverage shown in FIG. 1, according to the present invention.
Figure 5:
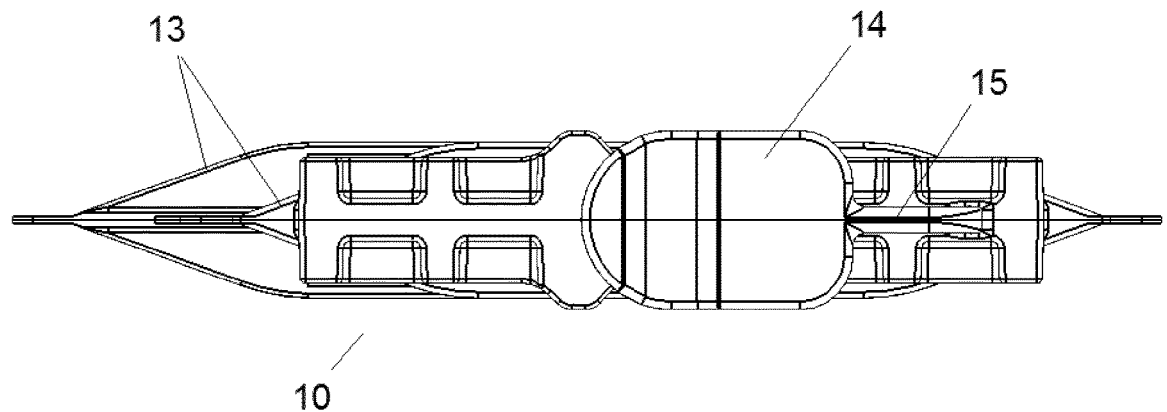
FIG. 5 shows a rear detailed view of the fitment assembly of the disposable pack for extracting a coffee beverage shown in FIG. 1, according to the present invention.

Preferably, the introduction of the fitment assembly 10 in the bottom edge of the container during the sealing of its edges to configure the complete pack 100 makes it possible that the flexible sheets 25, 26 can cover at least partially the fitment assembly 10. As shown in FIG. 2, for example, the fitment assembly 10 comprises a chamber called inlet chamber 120 which is configured by part of the fitment assembly 10 together with part of the flexible sheets 25, 26 when arranged at least partially over the two sides of the fitment assembly 10. The inlet chamber 120 will be pierced by injecting means 230, preferably piercing and injecting means, in the machine which will produce the coffee beverage from the pack 100: in fact, this inlet chamber 120 will be pierced in the part of the flexible sheets 25, 26 which are arranged over the external parts of the fitment assembly 10 making the inlet chamber 120. Consequently during the single step of bonding the edges of the sheet, it is possible to simultaneously create the inner volume of the container 20, to place the fitment assembly 10 and to close the inlet chamber 120. Preferably the outlet duct 12 is not completely covered by the flexible sheets. Yet it can be visually hidden by a part of the sheets e.g. by a skirt of the sheets. Also preferably, according to the invention, the fitment assembly 10 comprises ribs 13 arranged in at least one of the external surfaces of the fitment assembly 10 for improving the adhesion of the fitment assembly 10 with the flexible material sheet during sealing.

Figure 12:
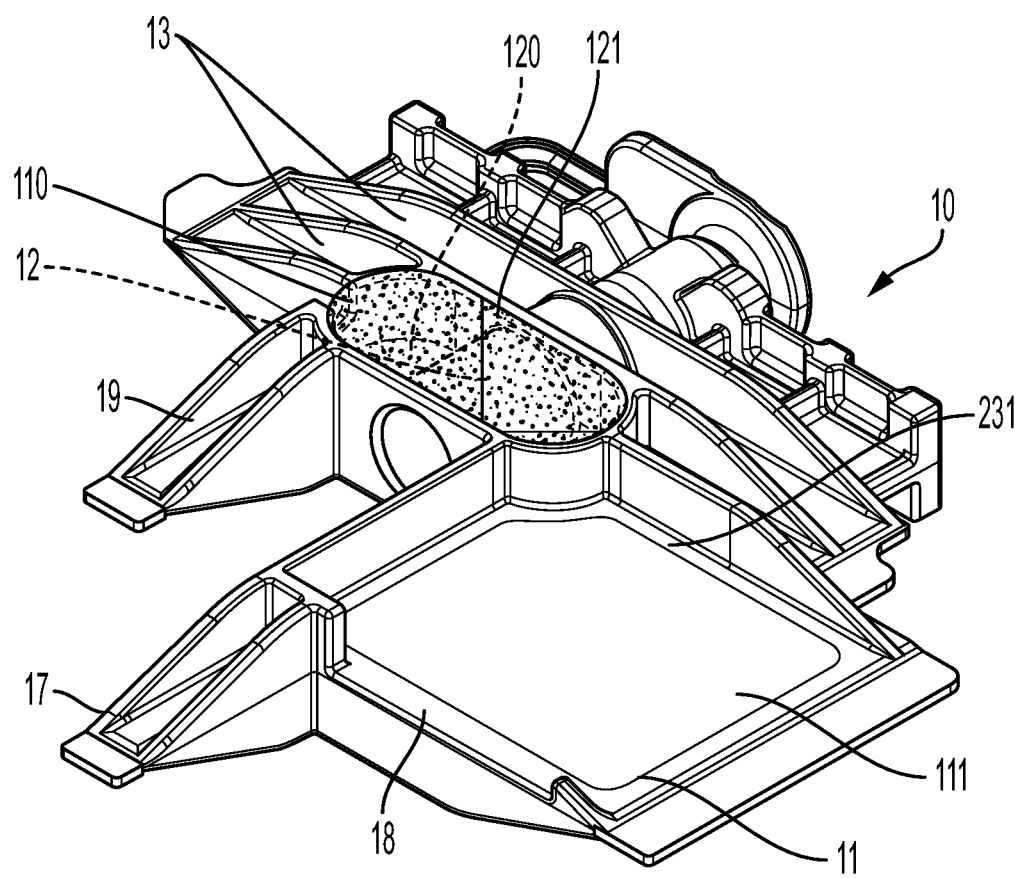
FIG. 12 shows an isometric detailed view of the fitment assembly of the disposable pack for extracting a coffee beverage shown in FIG. 1, according to the present invention.

The fitment assembly 10 of the present invention comprises a lid 121, preferably a yieldably pierceable lid made of a flexible material: this lid 121 comprises a first section overlying one of the two reversible parts of the inlet chamber 120 which is in the same side (frontal or rear) of the tertiary active chamber 231, and the tertiary active chamber 231, the lid 121 also comprising a second section overlying the second reversible part of the inlet chamber 120 (which is on the same side as the tertiary passive chamber 232), and the tertiary passive chamber 232. (See FIG. 12). Preferably, according to the invention, this lid 121 is made from the same flexible sheets 25, 26 which configure the two sides of the container 20, for manufacturing reasons. However, the lid 121 could be made out of different parts.

Figure 6:
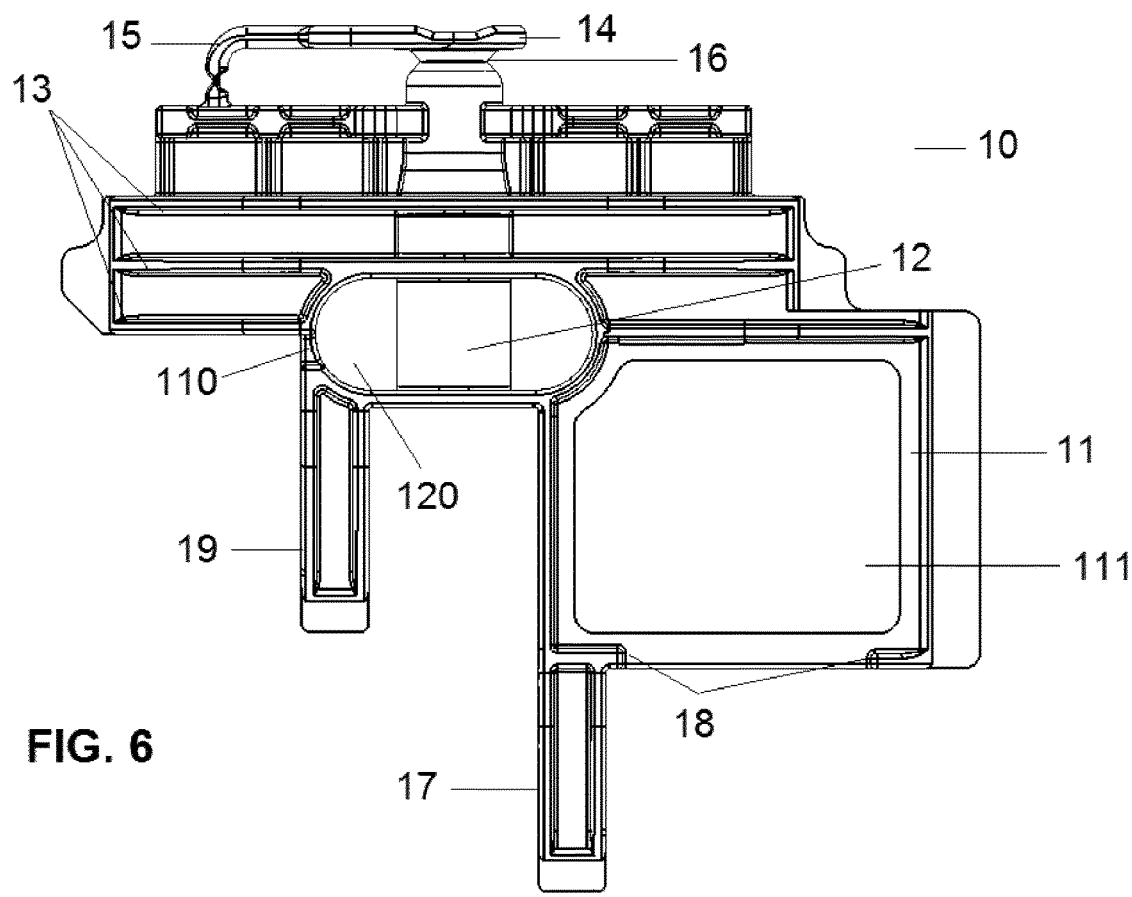
FIG. 6 shows a top detailed view of the fitment assembly of the disposable pack for extracting a coffee beverage shown in FIG. 1, according to the present invention.
Figure 7:
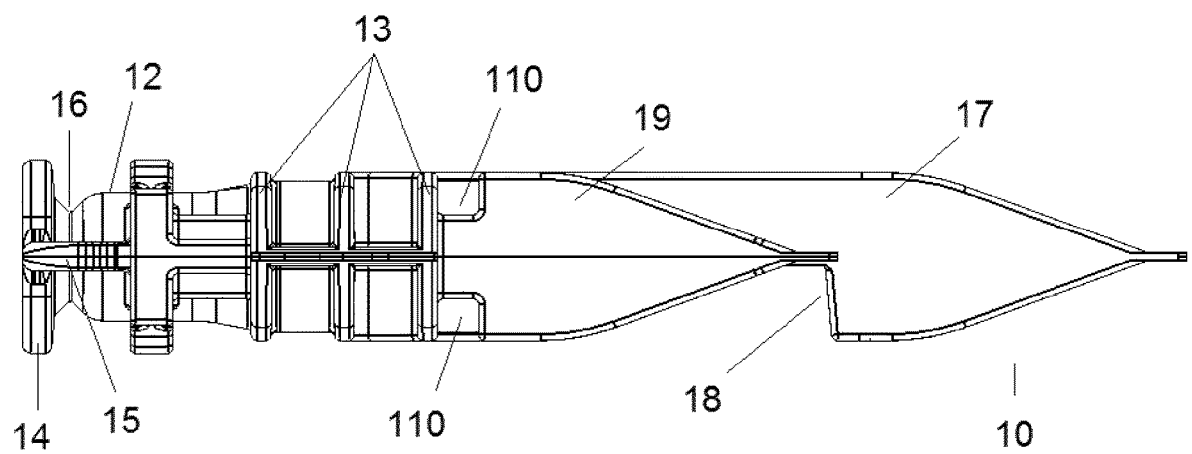
FIG. 7 shows a side detailed view from the left of the fitment assembly of the disposable pack for extracting a coffee beverage shown in FIG. 1, according to the present invention.

As already described and as it is shown in FIGS. 2 and 6, the fitment assembly 10 of the invention comprises an inlet chamber 120 into which a fluid is injected by injecting means 230, preferably piercing and injecting means, typically a needle, which is arranged in a machine into which the pack 100 is inserted for the coffee beverage to be extracted and dispensed. The fitment assembly 10 also comprises an inlet notch 110 in the part of the fitment assembly 10 defining the inlet chamber 120: preferably, the inlet notch 110 comprises two notches symmetrically arranged, through which the fluid injected into the inlet chamber 120 (preferably hot water) passes towards the primary chamber 21 and is further conveyed upwards and into the secondary chamber 22 passing through the fluid distributor 24. The piercable lid or cover comprised over the inlet chamber 120 (the one which is pierced by the piercing and injecting means 230) is preferably made out of the flexible sheets 25, 26 when laid over the frontal and rear sides of the fitment assembly 10: therefore, these parts of the flexible sheets will be pierced by the piercing and injecting means 230, typically a needle, perforating this flexible cover and then injecting fluid, preferably water, into the inlet chamber 120.

The fitment assembly 10 of the invention also comprises ribs 13, preferably arranged on both sides of the fitment assembly 10: these ribs 13 are provided on the sides of the fitment assembly 10 to help engage the sheets 25, 26 onto the fitment assembly 10, preferably by welding or heat sealing. Moreover, the fitment assembly 10 comprises an outlet duct 12 through which the brewed product (coffee beverage extracted) is finally dispensed. Preferably the outlet duct 12 is closed by a plug 14, said plug 14 comprising means for maintaining it attached to the fitment assembly 10 after the opening of the outlet duct 12. Consequently the plug 14 does not interfere with the dispensing of the coffee beverage when it is provided through the outlet duct 12, neither does it fall in the beverage during its production. The means for maintaining the plug 14 attached to the fitment assembly 10 can be a plastic bond 15 attached to the fitment assembly 10, for example, or any other suitable means providing a similar effect. Moreover, the outlet duct 12 can also comprise a weakened area 16 near the plug 14: this weakened area 16 can be made for example as a narrowing of the outlet duct 12 so that it is easier to cut or tear off the plug 14 by the machine once the pack 100 is introduced in it for being processed. Typically, the machine where the pack 100 is introduced cuts or tears the plug 14 automatically when the pack 100 is introduced in the machine or when the or when the beverage preparation is activated.

The outlet duct 12 in the fitment assembly 10 of the invention is preferably configured so that it delivers the product as a free flow, meaning that the product can flow from the outlet duct 12 by simple gravity fall. According to a preferred embodiment of the invention, the outlet duct 12 comprises an opening 121 at the bottom of the fitment assembly 10, said opening 121 having a transverse section with a surface area equivalent to the surface of a circular surface of diameter of at least 1 mm, preferably at most 4 mm, even more preferably comprised between 1.5 and 3 mm. The outlet duct 12 is typically configured as a straight tube oriented essentially vertically in the fitment assembly 10, comprising at its end an opening 121. The length of the tube of the outlet duct 12 is preferably of at least 5 mm. An advantage of the outlet duct 12 of the present invention is that there is no need to implement a particular connection between the mentioned outlet and the machine when a beverage is produced in order to direct the flow of the beverage delivered at the outlet duct 12: the beverage can flow from the outlet duct 12 directly into a drinking cup.

According to the invention, before the coffee beverage is extracted, the outlet duct 12 is closed at its end: generally the outlet duct 12 is closed by manufacturing and is configured for being opened at the food or beverage production step by the machine. By "closed by manufacturing" it is meant that a complete pack 100, comprising the container 20 and the fitment assembly 10, is manufactured with a closed outlet duct 12. This closure guarantees hygienic and shelf life protection. The outlet duct 12 can be opened by the machine extracting the coffee beverage or it can be opened manually by the consumer.

Preferably the plug 14 is part of one single fitment assembly 10: in particular when the spout assembly 10 is made by injection moulding, the design of the mould also comprises that of the plug 14. In the same manner the plastic bond 15 can also be part of the design of the fitment assembly 10 when it is made by injection moulding, which again provides advantages from a manufacturing point of view, as the same part comprises the plug 14 and the bond 15.

The fitment assembly 10 of the invention further comprises a primary filter element 11 integrated within the fitment assembly 10: preferably, when the fitment assembly 10 is made by injection moulding, the primary filter element 11 is also part of the design, so it is made by injection moulding too. The primary filter element 11 comprises one primary filtering active side 111, through which the extracted coffee beverage is passed in order to be filtered, so that the particles of coffee powder stay in the secondary chamber and in the tertiary active chamber 231 and only the liquid of coffee beverage passes through into the tertiary passive chamber 232, in order to be delivered through the outlet duct 12. The primary filter element 11 also comprises a primary filtering passive side 112, through which fluid cannot pass. Therefore, the filtering of the fluid can only take place in one sense in the primary filter element 11, from the primary filtering active side 111 towards the primary filtering passive side 112. Typically this is achieved by the use of a filtering element comprising punching or piercing on one of the sides only, of a very small size, allowing only liquid to pass through and preventing the small particles of coffee powder to go through, such that the coffee particles remain in the tertiary active chamber 231.

Figure 8:
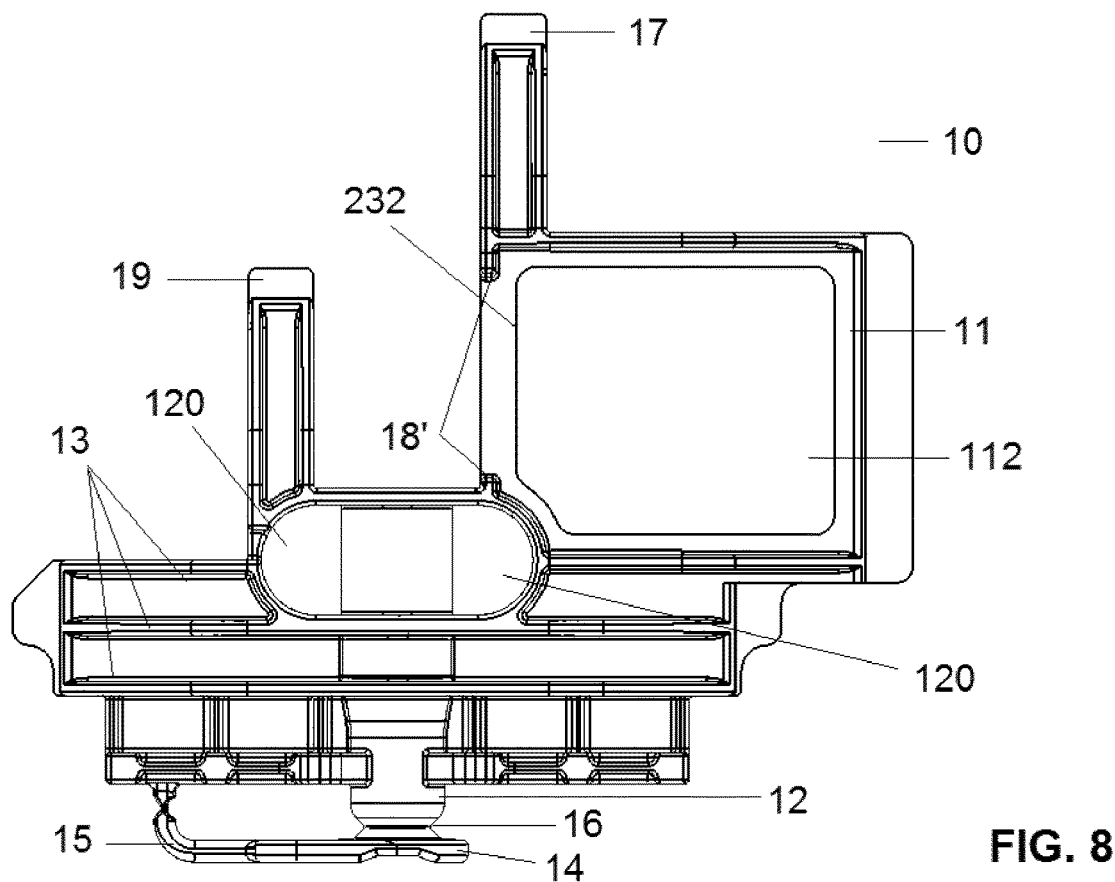
FIG. 8 shows a bottom detailed view of the fitment assembly of the disposable pack for extracting a coffee beverage shown in FIG. 1, according to the present invention.

The fitment assembly 10 also comprises, as depicted in FIG. 8, an upper sealing wall 17 which is arranged on top of the primary filter element 11 to which the sheets 25, 26 are welded or heat sealed to configure one of the sides of the secondary chamber 22. The fitment assembly 10 further comprises a lower sealing wall 19 arranged over the inlet chamber 120.

The fitment assembly 10 according to the present invention further comprises an upper filtering notch 18 on the upper rear side of the primary filter element 11 and a side frontal filtering notch 18' on the side of the primary filtering element 11: the brewed fluid (coffee beverage) from the secondary chamber 22 is conveyed through this upper filtering notch 18 into the tertiary active chamber 231 from where it is filtered in through the primary filtering active side 111 into the tertiary passive chamber 232, from where the brewed and filtered fluid (therefore, only coffee liquid as the coffee powder particles are prevented from passing through) is then conveyed through the side filtering notch 18' to the outlet duct 12 from where it flows down and is dispensed into a drinking cup.

The fitment assembly 10 is preferably rigid and is made of a rigid plastic material, preferably by injection moulding. Typically, this plastic material configuring the fitment assembly 10 can be selected from the following: polypropylene, polyethylene, polyethylene terephthalate and polylactic acid. Also according to a less preferred embodiment the fitment assembly 10 can be made of a metal like aluminium or tin-plate, for example.

According to the invention, the pack 100 will also be provided with identification means 30: these identification means 30 comprise the information of the beverage medium (type of roast and ground coffee powder) comprised in the pack 100 and also the information for the optimum processing of this coffee powder in a machine where the beverage will be prepared (therefore, comprising the recipe information to make the coffee beverage) comprised in the pack 100 and also the information for the processing of the coffee powder in the machine to extract the coffee beverage targeted. The identification means 30 will be arranged either in the fitment assembly 10 and/or in the container 20. A simpler execution will be to provide these identification means 30 in the pack 20, preferably in the lateral sides 27, 27' where the flexible sheets 25 and 26 are welded or heat sealed together and where there is no product preventing this arrangement. The identification means 30 comprise the information provided to the machine regarding the process parameters to be followed to extract the coffee beverage, in particular: temperature of the fluid (typically water) introduced by the injecting means 230 in the inlet chamber 120, total volume of water introduced and water flow to be provided through the mentioned means. Further explanation will be provided in the description that follows.

One of the primary advantages of the present invention is that the pack 100 is reversible, so the user can introduce it in one sense or the other in the machine, and the process will develop in the same way independently on the sense of introduction. For this reason, when the identification means 30 are provided in the pack 20, two sets of identification means 30 will preferably be provided, symmetrically arranged, on both lateral sides, 27 and 27', of the container 20 as shown in FIG. 1: in this way, the machine can read one or the other set of identification means 30, depending on the sense in which the pack 100 has been introduced in the machine.

Such identification means 30 can comprise any kind of recognition means such as, for example, mechanical codes, optical codes, RFID tags, bar codes, magnetic codes, embossing codes, LED or any other. Most preferably, the identification means 30 of the invention will be made as punched holes 31 (schematically represented in FIG. 1) arranged on the sealed lateral edges 27, 27' of the container 20. When the two sheets 25 and 26 are brought together and are welded or heat sealed on the edges to configure the container 20, additional punching will be provided, thus configuring the punched holes 31. A plurality of holes 31 will typically be provided vertically on each one of the lateral sides 27 and 27' of the container 20 to configure the two sets of identification means 30 symmetrically arranged in the container 20: these holes will be made transparent for light, allowing the light to pass through. When light passes through the plurality of holes 31 configuring these identification means 30, the machine will be then provided with information on the process parameters to follow in order to extract the coffee beverage targeted.

Figure 11:
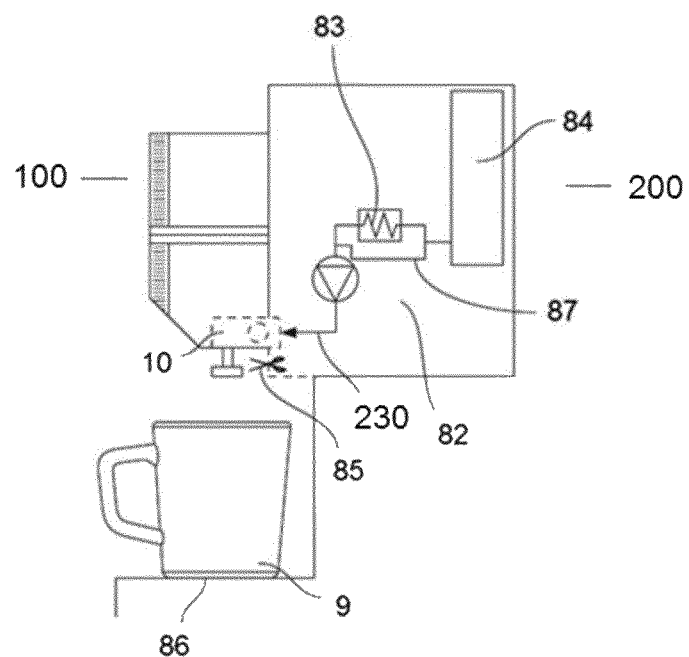
FIG. 11 shows the interaction of a disposable pack for extracting a coffee beverage according to the present invention with a beverage preparation machine.

According to yet another aspect, the invention refers to a machine 200 for extracting a coffee beverage from a pack 100 as described previously. The machine 200, as schematically illustrated in FIG. 11, comprises receiving means 201 adapted to accommodate the pack 100 preferably in such a way that the pack 100 is positioned vertically and the fitment assembly 10 is positioned at the bottom of the pack 100. The machine 200 further comprises injecting means 230, preferably piercing and injecting means, designed for piercing the cover or lid over the inlet chamber 120 for introducing water into the mentioned inlet chamber 120. Because the pack 100 is configured reversible, either if the pack 100 is introduced in one sense or the other in the machine 200, the piercing and injecting 230 means will pierce either one or the other side of the lid or cover over the inlet chamber 120, with same result as water will in any case be conveyed into the inlet chamber 20 and from there, through the symmetrically arranged inlet notches 110, into the primary chamber 21.

Preferably, the injecting means 230 comprise a fluid needle, called simply needle, comprising an inner duct or pipe through which fluid, typically water, is introduced in the inlet chamber 120. Water is injected at a pressure of typically less than 1 bar, more preferably at about 0.5 bar to extract the coffee beverage. As the pressure is low, there is no problem of tightness with the pack 100 and machine 200 of the invention. The water is introduced by the injecting means 230 in a continuous way during a certain time and under a certain flow rate and until a total volume of water is achieved, which is provided by the identification means 30 in the pack 100. The process with the pack 100 is done in a continuous way and is faster than standard processes (usually, it takes around 1 minute to have the beverage ready). The water injected by the piercing and injecting means 230 is preferably hot, and is preferably provided at a temperature comprised between 80° C. and 95° C.

The injecting means 230 can also comprise a toroidal ring, preferably made of rubber, ensuring that there is no leakage of fluid outside the inlet chamber 120 while the injecting means 230 are introduced and are injecting water into the inlet chamber 120.

The machine 200 also comprises a data reader, preferably comprising an optical device, which reads and retrieves the information from the identification means 30 regarding the process parameters to be used for extracting the coffee beverage. Preferably, the process parameters used by the machine 200 to prepare the correct recipe of the product in the pack 100, retrieved by the data reader, would be at least one or a combination of the following: temperature of the fluid (typically water) introduced by the injecting means 230 in the inlet chamber 120; total volume of water introduced in the inlet chamber 120; and water flow provided through the piercing and 230 injecting means also into the inlet chamber 120.

Preferably, the data reader will retrieve the information from the identification means 30 in the pack 100 by a light emitter device emitting light passing through the punched holes 31 configuring the identification means 30.

Figure 9:
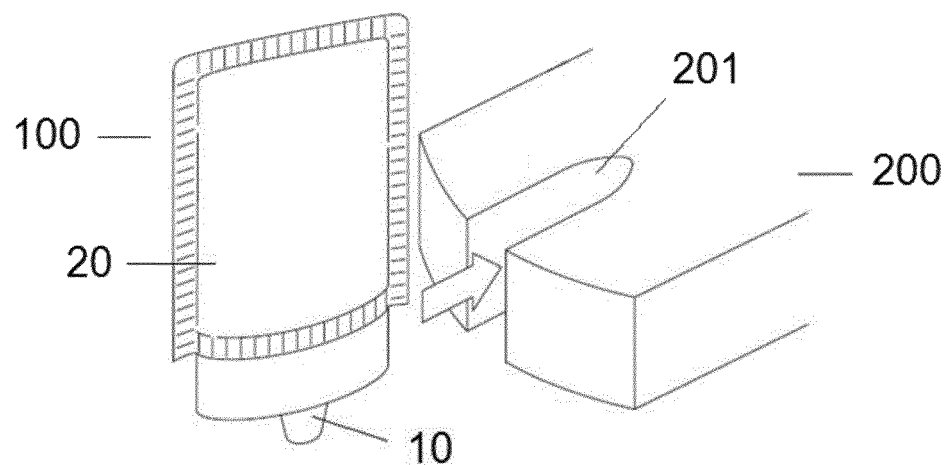
FIG. 9 shows an illustration of a possible embodiment of a machine designed for slidably receiving a disposable pack for extracting a coffee beverage according to the present invention.
Figure 10:
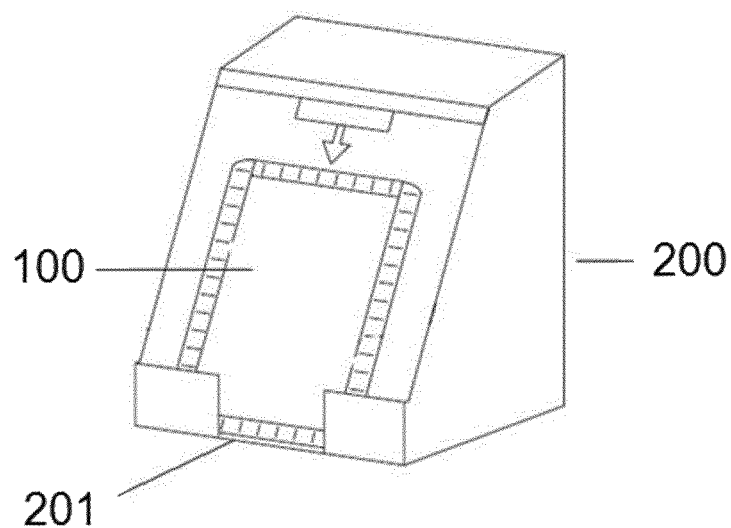
FIG. 10 shows an illustration of another possible embodiment of a machine designed for receiving frontally a disposable pack for extracting a coffee beverage according to the present invention.

Typically, as the pack 100 is processed to extract the coffee beverage in an essentially vertical position in the machine 200, the pack 100 will be introduced either frontally in the machine 200 (as schematically represented in FIG. 10) or laterally, so that the pack 100 is slidably inserted into a dedicated insert in the machine 100 (as schematically represented in FIG. 9). In the first case, that of FIG. 10, the receiving means 201 in the machine 200 will be arranged to accommodate the pack 100 in a frontal position: as the pack 100 is reversible, it can be introduced either in a frontal positioning in the dedicated receiving means 201, or in a rear positioning in said receiving means 201. In the second case, that of FIG. 9, the receiving means 201 in the machine 200 will be arranged to accommodate the pack 100 in a lateral or side position: as the pack 100 is reversible, it can be introduced in any of the two possible lateral senses into the dedicated receiving means 201. In any of the two cases described, the injecting means 230, typically piercing and injecting means, will be able to pierce and inject water in one of the two sides of the inlet chamber 120, and the data reader will also be able to read the information in one of the two sets of identification means 30 provided in the container 20.

Moreover, the machine 200 of the invention comprises a fluid supply or tank 84 and a pump 82, preferably a water pump, providing water to the injecting means 230. This water is preferably provided at a certain temperature, preferably comprised between 80° C. and 95° C., with the aid of a heater 83. The machine can optionally also comprise a bypass line 87 for delivering fluid, typically water, at ambient temperature, and a valve (not illustrated) for the selection of either hot or ambient fluid. The machine 200 will also typically comprise a device 85 for cutting or tearing the plug 14 from the outlet duct 12 once the pack 100 has been inserted in the machine 200 or once the brewing process has started.

The cutting device 85 for cutting or tearing the plug 14 is preferably arranged in the machine 200 in such a way that the plug is automatically cut when the pack 100 is introduced in the machine 200 or when the beverage preparation is activated.

Preferably the machine 200 further comprises a positioning area 86 for allocating a drinking cup 9 under the dispensing outlet duct 12 of the pack 100 when a beverage is prepared.

Also, the machine 200 typically comprises squeezing means (not illustrated in FIG. 11) which squeeze the container 20 once the beverage has been dispensed in order to extract any remaining liquid inside the container 20, so as to avoid dripping. Moreover, the squeezing of the container 20 will allow that the end pack 100, which is preferably disposable, will have a final more compact shape that will facilitate its removal.

Also according to the invention, a pack 100 as the one described above comprising a fitment assembly 10 and a container 20, would preferably be made following these steps:
- folding a sheet of material and bonding both lateral sides 27 and 27' of it to form a pouch;
- bonding together by welding or heat sealing the two sheets 25 and 26 to conform the compartmental channel 250;
- filling the secondary chamber 22 configured inside the volume of the pack 100 with a beverage medium, preferably roast and ground coffee powder;
- positioning the fitment assembly 10 in the lower part of the pouch, where remaining open edges exist and bonding (by welding or heat sealing) said lower side 29;
- configuring the identification means 30 preferably by punching the lateral sides 27 and 27' of the pouch or container 20;
- configuring the fluid distributor 24 on the upper part of the pouch, also by punching.

The method of using a pack 100 configured as previously described, comprising a fitment assembly 10 and a container 20, in a machine 200 to extract a coffee beverage can comprise several steps, as will be described herewith in what follows.

First, the pack 100 is introduced in the machine 200 in an essentially vertical way, in such a manner that the fitment assembly 10 is arranged at the bottom side of the pack 100. Either once the pack has been introduced or once the preparation and dispensing step starts, the machine 200 will cut or tear off the plug 14 from the outlet duct 12 in order to leave open the opening of the outlet duct 121. Then, the injecting means 230, preferably piercing and injecting means, from the machine 200 will pierce the lid or membrane arranged over the inlet chamber 120. As already explained, any of the two sides of the membrane over the inlet chamber 120 will be pierced, depending on the sense in which the pack 100 has been introduced in the machine 200.

Also, the data reader of the machine 200 will read the identification means 30 in one of the sides 27 or 27' of the container 20, depending on the sense in which it has been introduced. The data reader will then retrieve the information regarding the temperature, the total volume and the flow rate of the fluid, typically water, to be introduced by the piercing and injecting means 230 into the inlet chamber 120.

Once the membrane is pierced, the injecting means 230 will inject preferably hot water, inside the inlet chamber 120, at a pressure below 1 bar, most preferably at around 0.5 bar. The rest of parameters of this injection (temperature, volume and flow rate, referred to before as process parameters) will have been provided by the data reader when reading the identification means 30. The water injected will then be conveyed from the inlet chamber 120 through the inlet notch 110 into the primary chamber 21, where it will be conveyed upwards, flowing in a continuous way from the lower part of the primary chamber 21 towards the upper part of the chamber 21.

The fluid coming upwards of the primary chamber 21 will then be conveyed into the inner volume of the secondary chamber 22 through the fluid distributor 24, in order to extract a coffee beverage by means of the flow of hot water that flows through the roast & ground coffee powder confined in the inner volume of the secondary chamber 22.

Once in this secondary chamber 22, the extracted coffee beverage will be conveyed to the lower part of said chamber by gravity and will be forced to pass through the upper filtering notch 18 (as there is the upper sealing wall 17 sealed on its perimeter to the flexible sheets 25, 26 preventing the fluid to go through it) and into the tertiary active chamber 231.

From the tertiary active chamber 231 the fluid will then pass through the primary filtering active side 111 into the tertiary passive chamber 232, thus being filtered: only the liquid will pass through the primary filter element 11 and into the tertiary passive chamber 232, the coffee powder particles being retained in the tertiary active chamber 231. The filtered coffee liquid will then be conveyed through the side filtering notch 18' and into the outlet duct 12 from where the final product is dispensed.

It is important to remark that the design of the fitment assembly 10 together with the flexible sheets 25 and 26 which are bonded (welded or thermo sealed, typically) to it define paths for the fluid to flow inside the pack 100 in such a way that the fluid is forced to follow these paths and cannot go through any others. In fact, the sheets 25, 26 are bonded to the fitment assembly 10 in a tight way, therefore tight paths are configured. Moreover, the primary chamber 21 and the secondary chamber 22 in the container 20 are also tight and the fluid is again conveyed under certain paths.

Particularly, these sealed or tight paths are the following:
once the fluid is injected into the inlet chamber 120, the only path to follow is that formed by the inlet notches 110 in the inlet chamber 120 together with the flexible sheets 25 and 26, so the fluid is forced to pass through these inlet notches 110 and flow into the primary chamber 21;
inside the primary chamber 21, the fluid can only be conveyed upwards and towards the fluid distributor 24, through the lateral side of the container 27 and the compartmental channel 250;
inside the secondary chamber 22, the fluid can only flow downwards by gravity and towards the upper filtering notch 18, flowing between the compartmental channel 250 and the lateral side of the container 27', passing through the upper filtering notch 18 into the tertiary active chamber 231;
inside the tertiary active chamber 231, everything is sealed and the only path possible for the fluid is to go through the primary filtering active side 111 of the primary filter element 11, and into the tertiary passive chamber 232;
inside the tertiary passive chamber 232, everything is sealed and the only way possible for the fluid is to go through the side filtering notch 18', therefore being confronted with the opening of the outlet duct 12, from where the coffee fluid (already extracted and filtered) is finally dispensed by gravity into a drinking cup or the like.

At the end of the process, the squeezing means of the machine 200 will squeeze the container 20 with the aim of evacuating any remaining liquid inside the container 20, in order to avoid any dripping, and also with the aim of reducing the final volume of the container 20, making it more compact, so that its removal is easier.

Some of the advantages of the disposable pack of the invention and of the machine processing these packs will be described in what follows.

The pack of the invention is configured in a reversible way, so it can be operated in the machine in any sense in which it has been introduced, which presents a primary advantage for the consumer, who does not need to check or introduce the pack in a specific way. Therefore, it is one aim of the invention to propose a consumer friendly preparation of coffee beverages, where the beverage from the pack is ready to be served and does not require any additional processing. Moreover, best in-cup results are achieved as the extraction and processing is pre-defined and in fact comprised in the information on the identification means.

Another advantage comes from the manufacturing of the packs of the invention: as the fitment assembly has the same outer shape on both of its sides, when the flexible sheets are laid over at least part of this fitment assembly, there is no risk of crippling.

Also, in the pack of the invention the ingredients are fully protected from atmosphere before use. Besides, these packs present a low environmental impact since they can be made of a laminated pouch with a small insert piece (fitment assembly) of plastic.

The space needed for storing the packs according to the invention, the space needs the consumer has to preview for the packs is clearly much less than that for typical capsule containers, for example.

Other advantages of the invention come from the machine: the machine elements remain very simple and limited to a simple fluid needle, typically a simple water needle, piercing the pack and injecting the fluid, typically water, into the pack, to extract the coffee beverage. Also, the data reader needed to read and retrieve information from the identification means is a simple device.

Also, another important advantage of the invention is to propose packs where the contact of ingredients and extracted beverage with the machine is avoided and the risk of cross contamination is therefore limited. The prepared beverages present optimal organoleptic properties.

Another main advantage for the consumer, provided by the invention is that the piercing and injecting means, typically a needle, do not touch the product at all, so any type of contamination is avoided.

Besides, some other advantages of the pack of the invention are indicated herewith:
- the pack is flexible and adaptable, thus easy to handle
- the weight of the pack is low and remains minimised
- the extraction parameters come with the pack and the recipe is therefore optimised, for each product obtained
- the pack is disposable so requires no cleaning of the machine and is extremely practical to use
- the machine operates the pack under direct flow, so there is no fluid which flows inside any part of the machine, avoiding any cleaning needs or any possible contamination in the machine
- the process of obtaining the extraction of coffee beverage is continuous, which therefore minimises the time needed
- the extracted coffee beverage directly flows into the cup or recipient, so the process is simple and easy for the consumer.

Although the present invention has been described with reference to preferred embodiments thereof, many modifications and alternations may be made by a person having ordinary skill in the art without departing from the scope of this invention which is defined by the appended claims.

LIST OF REFERENCES

100 Disposable Pack
  21 Primary chamber
  22 Secondary chamber
  23 Tertiary chamber
    231 Tertiary active chamber
    232 Tertiary passive chamber
  120 Inlet chamber
    110 Inlet notch
10 Fitment assembly
  11 Primary filter element
    111 Primary filtering active side
    112 Primary filtering passive side
  12 Outlet duct
    121 Opening outlet duct
  13 Ribs
  14 Plug
  15 Bond
  16 Weakened area
  17 Upper sealing wall
  18 Upper filtering notch
  18' Side filtering notch
  19 Lower sealing wall
20 Container
  25 Sheet of container
  26 Sheet of container
  210 Excrescence
  30 Identification means
    31 Punched holes
  24 Fluid distributor
    240 Distributor configuring elements
  250 Compartmental channel
  27 Lateral side of container
  27' Lateral side of container
  28 Upper side of container
  29 Lower side of container
200 Machine
  201 Receiving means
  9 Drinking cup
  230 Injecting means
  85 Cutting device
  84 Fluid tank
  83 Heater
  87 Bypass line
  82 Pump
  86 Positioning area

The invention claimed is:

1. A pack for preparing a beverage, comprising a container where a coffee ingredient is stored and a fitment assembly, the fitment assembly comprising: an inlet chamber to accommodate an inflow of fluid for flowing through the coffee ingredient to extract the beverage; a first tertiary chamber on one side of the fitment assembly to where extracted coffee fluid together with coffee ingredient particles is conveyed and a second tertiary chamber on a reverse side of the fitment assembly configured to receive the extracted coffee fluid after having been filtered; a primary filter element configured to filter the extracted coffee fluid coming from the first tertiary chamber and flowing into the second tertiary chamber in such a way that only the extracted coffee fluid can go through and into the second tertiary chamber while the coffee ingredient particles are retained in the first tertiary chamber; and an outlet duct configured for the extracted coffee beverage from the second tertiary chamber to enter the outlet duct and flow by gravity towards an exterior of the fitment assembly;

the container comprises a first flexible sheet bonded to a second flexible sheet on at least lateral sides of the first and the second flexible sheets, the first tertiary chamber is delimited by the first flexible sheet and a first side of the primary filter element, the second tertiary chamber is delimited by the second flexible sheet, a second side of the primary filter element, and an upper sealing wall arranged on top of the primary filter element;

the first tertiary chamber is in fluid communication with the second tertiary chamber; and wherein the first and the second flexible sheets are bonded together in a specific area forming a compartmental channel inside a volume of the pack, the compartmental channel being arranged in such a way that the compartmental channel defines inside the volume of the pack a primary chamber, configured to receive the inflow of fluid from the inlet chamber, and a secondary chamber configured to receive the inflow of fluid from the primary chamber to flow through the coffee ingredient before entering the first tertiary chamber which is located below the secondary chamber.

2. The pack according to claim 1 presenting a plane shape being flexible and forming a pouch or sachet, the pack being oriented along a plane vertically oriented during beverage production.

3. The pack according to claim 1, wherein the fitment assembly is bonded to a remaining open edge of the pack in such a way that the first and the second flexible sheets also form a pierceable lid over the fitment assembly.

4. The pack according to claim 1, wherein the first and the second flexible sheets comprise one single flexible sheet folded in half into two parts joined at free edges of the single flexible sheet to define an inner volume of the container.

5. The pack according to claim 1, wherein the first and the second flexible sheets are water impermeable, are bonded together by thermo sealing and are made of a material selected from the group consisting of: plastic laminates, metallised foil, alufoil, and fiber base material.

6. The pack according to claim 1, further comprising a fluid distributor arranged on one side of the secondary chamber configured for the inflow of fluid leaving the primary chamber to enter the secondary chamber through the fluid distributor which homogeneously distributes the flow of the inflow of fluid, typically hot water, into the secondary chamber to flow through the coffee ingredient confined in the secondary chamber.

7. The pack according to claim 6, wherein the fluid distributor is comprised of certain parts of the first and the second flexible sheets bonded together, the bonded parts defining a plurality of fluid distributor configuring elements allowing a homogeneous distribution of the inflow of fluid into the secondary chamber.

8. The pack according to claim 1, wherein distribution and homogenisation characteristics of the fluid distributor are a function of the size and number of the plurality of fluid distributor elements and of the distance between the plurality of fluid distributor elements.

9. The pack according to claim 1, further comprising an identification member comprising information on process parameters to produce the beverage, as a function of the type of coffee ingredient comprised in the pack, the process parameters being selected from the group consisting of: temperature of the fluid accommodated into the inlet chamber, total volume of the fluid accommodated in the inlet chamber, and the fluid flow accommodated inside the inlet chamber.

10. The pack according to claim 9, comprising two sets of the identification member, wherein the two sets of the identification member are symmetrically arranged in the pack, so that the process parameters in the identification member can be reversibly read.

11. The pack according to claim 9, wherein the identification member comprises a recognition member selected from the group consisting of: mechanical codes, optical codes, RFID tags, bar codes, magnetic codes, embossing codes and LED.

* * * * *